Patented May 15, 1945

2,376,088

UNITED STATES PATENT OFFICE 2,376,088

METHOD OF TREATING FRIEDEL-CRAFTS REACTION LIQUORS

Harold A. Robinson, Midland, Mich., assignor to The Dow Chemical Company, Midland, Mich., a corporation of Michigan No Drawing. Application October 4, 1939, Serial No. 297,813

5 Claims. (Cl. 260—671)

The present invention relates to a process for the removal of dispersed organo-metal halide complex catalysts of the Friedel-Crafts type from reaction liquors obtained in the alkylation of aromatic compounds.

As is well known, the active catalyst in a Friedel-Crafts reaction is not the metal halide originally added, but is an organo-metal halide complex compound which is usually present as a brown sludge-like mass suspended in the reaction liquor. In the preparation of alkylated aromatic compounds according to the Friedel-Crafts synthesis, the usual procedure is to introduce an olefin or alkyl halide into an agitated mixture of an aromatic hydrocarbon or halohydrocarbon and an organo-metal halide complex catalyst. Then, when the desired amount of alkylating agent has been added, agitation of the reaction mixture is discontinued. The major portion of the suspended catalyst settles to the bottom of the reaction vessel and may be withdrawn for reuse in subsequent alkylations. However, an appreciable quantity of the organo-metal halide complex catalyst never settles from the reaction liquor, but remains dissolved or otherwise dispersed in the crude reaction product, and cannot be removed by physical means. In addition, during the alkylation, a significant quantity of free hydrogen halide is generated and this also remains dissolved in the crude liquor. As is known, the presence of such hydrogen halide is desirable in that it greatly increases the activity of the organo-metal halide catalyst and thereby accelerates the rate of alkylation.

However, the presence of the dispersed catalyst and dissolved hydrogen halide in the crude alkylated product greatly complicates the separation and purification of the alkylated compounds formed in the reaction, particularly in large scale or continuous operation. Thus when attempt is made to separate the individual products by fractional distillation without first removing the dispersed organo-metal halide, this material tends to catalyze decomposition and rearrangement of the alkylated products during the distillation process, and hence to reduce the yields of the desired compounds. Further, the dispersed catalyst itself tends to decompose on the heating surfaces of the distilling apparatus, forming tars and scaly deposits which decrease the rate of heat transfer through the still body and necessitate frequent cleaning operations.

To avoid these difficulties, it is customary to wash the crude alkylated product with an excess of cold water or aqueous alkali in order chemically to destroy the dispersed organo-metal halide complex and neutralize the dissolved hydrogen halide prior to the distillation step. Unfortunately, this procedure is disadvantageous in that the addition of water or aqueous solutions wets the crude product and necessitates the introduction of a drying operation before distillation. If the drying is not conducted with extreme care, equipment corrosion problems are encountered in the subsequent steps of the process. Moreover, the treatment with water frequently entails further difficulties resulting from emulsification of the aqueous phase in the crude alkylated product. In addition, the washing treatment removes the hydrogen halide dissolved in the crude product so that when unalkylated material is separated therefrom and returned to the alkylation step, it does not contain the hydrogen halide which is so advantageous in the alkylation. All these drawbacks have seriously limited the application of the Friedel-Crafts reaction to industrial chemical syntheses.

The chief object of the present invention is to provide a method of removing the dispersed organo-metal halide complex catalyst from Friedel-Crafts alkylation liquors which eliminates the distillation difficulties hereinbefore mentioned, and at the same time avoids the disadvantages of catalyst removal with water or aqueous solutions. Another object is to provide such a method wherein the hydrogen halide content of the alkylation liquor is conserved.

According to the invention, a dispersed organo-metal halide catalyst may be effectively removed from a Friedel-Crafts alkylation liquor without at the same time removing the hydrogen halide dissolved therein by treating the liquor with a controlled small proportion of ammonia under anhydrous conditions. The dispersed organo-metal complex is preferentially attached and substantially all converted to a flocculent precipitate which has no catalytic properties and does not interfere with subsequent distillation or other treatment of the alkylation liquor. Unless an excess of ammonia is used, the hydrogen halide present in the liquor is largely unaffected.

In an alkylation process utilizing the invention an olefin or alkyl halide is first reacted with an aromatic hydrocarbon or halohydrocarbon according to the usual Friedel-Crafts reaction procedures, in either a batchwise or continuous process. The resulting reaction liquor is usually allowed to stand for some time to permit settling and removal of the bulk of the sludge-like organo-metal halide catalyst, although this step is not essential. Then, according to the invention, the crude reaction product containing the remaining dispersed organo-metal halide complex catalyst is mixed with a controlled small proportion of anhydrous ammonia. This reagent reacts rapidly with the dispersed catalyst complex to form a flocculent precipitate which settles to the bottom of the reaction vessel and may be removed, if desired, by filtration, or otherwise. However, in view of the chemical inertness of the precipitate, this removal step is not necessary, and is usually not carried out. The crude alkylated liquor resulting from the ammonia treatment may be fractionally distilled in the customary manner to separate the alkylated products without fear of the decomposition inherent in prior art processes. The first fraction of the distillate is a mixture of unalkylated starting material and hydrogen halide; this mixture may be returned to the alkylation step, wherein it is more desirable than ordinary starting material by virtue of its hydrogen halide content, as already explained.

The flocculent precipitate formed by the interaction of ammonia and the organo-metal halide complex catalyst resembles a metal hydroxide in its appearance. The chemical identity of the material has not been clearly established, but it appears to be a metal ammonium salt or a metal-ammono complex.

In the process, the ammonia is added to the crude reaction liquor in a quantity substantially equivalent chemically to the metal in the organo-metal halide catalyst, i. e. in a quantity sufficient to deactivate substantially all of the catalyst complex without materially neutralizing the hydrogen halide present. The exact proportion of ammonia to be used cannot be stated in advance since it depends upon the particular alkylation being carried out, the precise nature of the catalyst employed, the concentration of the catalyst, and the reaction conditions. In practice, the ammonia is added in small portions until substantially all of the dispersed catalyst has been precipitated. This state may usually be judged with sufficient accuracy by inspection, but may if desired be determined with precision by chemical test or by electrical conductivity measurements. Excess ammonia is to be avoided, since it tends to neutralize the hydrogen halide present in the reaction liquor. In general, an amount of ammonia is required corresponding to between about 0.2 and about 12.0 gram-moles of ammonia per gram-atom of metal present in the catalyst to be removed. When the dispersed catalyst complex is present in ordinary concentration, i. e. after the bulk of the catalyst has been allowed to settle out, the proportion of ammonia is equivalent to between about 0.005 and 1.0 part by weight per 100 parts of liquor to be treated. It is usually not necessary to adjust the temperature of the crude alkylated product before the ammonia is added since the process is operable at any temperature between about 0° C. and about 150° C. In many instances, however, such as in the preparation of ethyl benzene, temperatures of 10° C. to 75° C. are preferable.

In practice, the ammonia may be added as such to the crude reaction liquor or it may be dissolved in a suitable nonaqueous solvent miscible with the reaction liquor, preferably in an aromatic hydrocarbon or halohydrocarbon. Alcohols and similar hydroxyl compounds are generally unsatisfactory solvents for the ammonia since these solvents tend to dissolve hydrogen halide from the reaction liquors and in some instances to react with the catalyst complex. The addition of ammonia, in any instance, is to be carried out under substantially anhydrous conditions since the presence of any significant quantity of water gives rise to the problems of the prior art methods.

The present process is particularly adapted to the removal of dispersed complex catalysts from alkylation liquors formed in the reaction of lower olefins or lower alkyl monohalides, such as ethylene, propylene, isobutylene, ethyl chloride, isopropyl bromide, mixtures of these substances, etc., with mononuclear aromatic hydrocarbons or halohydrocarbons, such as benzene, ethylbenzene, chlorobenzene, isopropyl brom-benzene, etc. The treatment is applicable to the removal not only of aluminum chloride complexes, but also of organo-metal halide complex catalysts formed from other metal halides of the Friedel-Crafts type, e. g. aluminum bromide, ferric chloride, stannic chloride, antimony trichloride, etc.

This application is a continuation-in-part of my co-pending application Serial No. 256,599 filed February 15, 1939, now Patent 2,246,007.

Other modes of applying the principle of the invention may be employed instead of those explained, change being made as regards the details hereinbefore disclosed, provided the steps stated by any of the following claims or the equivalent of such stated step or steps be employed.

I claim:

1. In a process for the preparation of alkylated aromatic compounds wherein an alkylating agent selected from the class consisting of lower olefins and lower alkyl monohalides is reacted with an aromatic compound selected from the class consisting of mononuclear aromatic hydrocarbons and halo-hydrocarbons in the presence of an organo-metal halide complex catalyst of the Friedel-Crafts type to form a crude alkylated product containing hydrogen halide, the step of removing dispersed organo-metal halide complex catalyst from the crude alkylated product which comprises treating said product with ammonia under substantially anhydrous conditions and in the absence of an organic hydroxyl compound solvent for the ammonia, the ammonia being added in a proportion equal to that required to deactivate substantially all of the catalyst complex and insufficient materially to neutralize the hydrogen halide in the product.

2. In a process for the preparation of ethyl benzene wherein ethylene is reacted with benzene in the presence of an aluminum chloride complex catalyst of the Friedel-Crafts type to form crude ethyl benzene containing hydrogen chloride, the step of removing dispersed aluminum chloride complex catalyst from the crude ethyl benzene which comprises treating said crude ethyl benzene at a temperature between about 10° C. and about 75° C. with ammonia under substantially anhydrous conditions and in the substantial absence of an organic hydroxyl compound solvent for the ammonia, the ammonia being added in a proportion equal to that required to deactivate substantially all of the catalyst complex and insufficient materially to neutralize the hydrogen halide in the product.

3. In a process for the preparation of alkylated aromatic compounds wherein an alkylating agent selected from the class consisting of lower olefins and lower alkyl monohalides is reacted with an aromatic compound selected from the class consisting of mononuclear aromatic hydrocarbons and halohydrocarbons in the presence of an organo-metal halide complex catalyst of the Friedel-Crafts type to form a crude alkylated product containing hydrogen halide, and wherein the major portion of the catalyst complex is then separated from the crude product, the step of removing any remaining dispersed organo-metal halide complex catalyst from the crude alkylated product which comprises treating said product with ammonia under substantially anhydrous conditions and in the absence of a solvent for the ammonia, the ammonia being added in proportion equal to that required to deactivate substantially all of the catalyst complex and insufficient materially to neutralize the hydrogen halide in the product.

4. In a process for the preparation of alkylated aromatic compounds wherein an alkylating agent selected from the class consisting of lower olefins and lower alkyl monohalides is reacted with an aromatic compound selected from the class consisting of mononuclear aromatic hydrocarbons and halohydrocarbons in the presence of an organo-metal halide complex catalyst of the Friedel-Crafts type to form a crude alkylated product containing hydrogen halide, and wherein the major portion of the catalyst complex is then separated from the crude product, the steps of removing any remaining dispersed organo-metal halide complex catalyst from the crude alkylated product which comprises treating said product with ammonia under substantially anhydrous conditions and in the absence of a solvent for the ammonia, the ammonia being added in proportion equal to that required to deactivate substantially all of the catalyst complex and insufficient materially to neutralize the hydrogen halide in the product, and thereafter fractionally distilling the crude product to separate a first fraction comprising unalkylated aromatic compound and hydrogen halide and a second fraction comprising alkylated product, and returning the said first fraction to the alkylation step.

5. In a process for the preparation of ethyl benzene wherein ethylene is reacted with benzene in the presence of an aluminum chloride complex catalyst of the Friedel-Crafts type to form crude ethyl benzene containing hydrogen chloride, and wherein the major proportion of the catalyst complex is then separated from the crude ethyl benzene, the step of removing any remaining dispersed aluminum chloride complex catalyst from the crude ethyl benzene which comprises treating said crude ethyl benzene at a temperature between about 10° C. and about 75° C. with ammonia under substantially anhydrous conditions and in the substantial absence of a solvent for the ammonia, the ammonia being added in a proportion equal to that required to deactivate substantially all of the catalyst complex and insufficient materially to neutralize the hydrogen chloride in the product.

HAROLD A. ROBINSON.